Dec. 28, 1965     R. F. HOUSEL ETAL     3,226,169
COMPACT, HIGH LOAD, ANTI-FRICTION BEARING ASSEMBLY
Filed Feb. 26, 1965
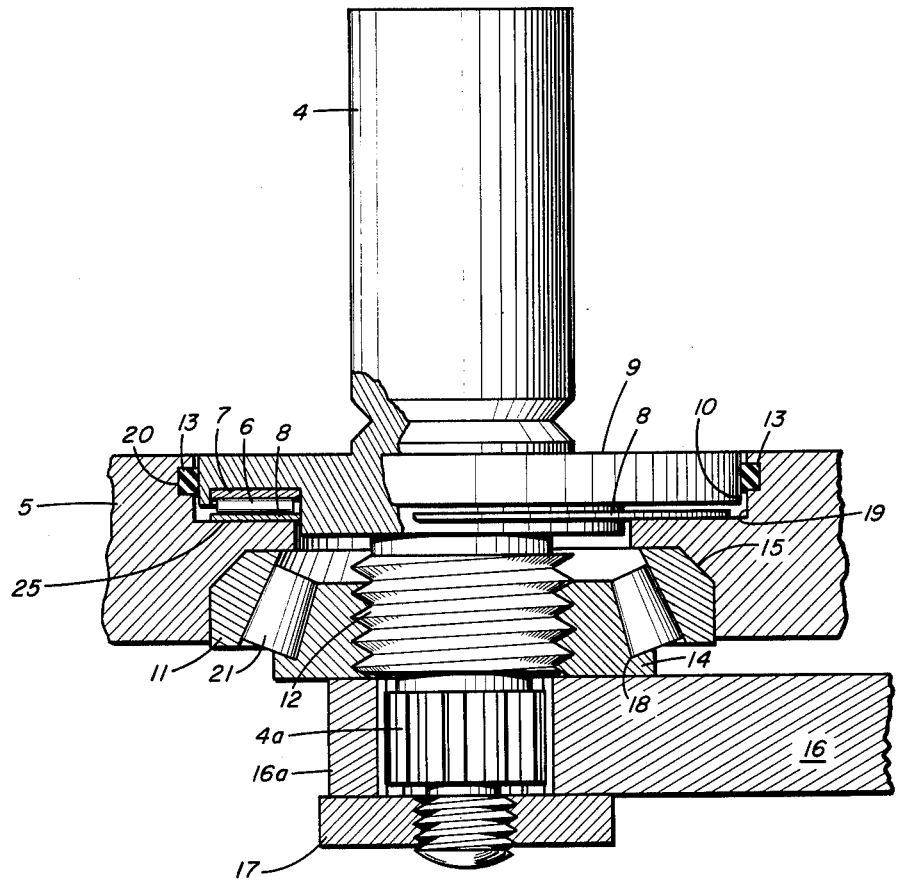
Richard F. Housel
Irvin C. Henschen
INVENTORS.

United States Patent Office 3,226,169
Patented Dec. 28, 1965

3,226,169
COMPACT, HIGH LOAD, ANTI-FRICTION BEARING ASSEMBLY
Richard F. Housel, Clarksville, and Irvin C. Henschen, Silver Spring, Md., assignors to the United States of America as represented by the Secretary of the Navy
Filed Feb. 26, 1965, Ser. No. 435,753
1 Claim. (Cl. 308—219)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of applicants' copending application Serial No. 258,088, filed February 12, 1963, now abandoned.

The present invention relates to a compact anti-friction bearing asembly and more particularly to an anti-friction bearing assembly for rotatably mounting a shaft in a housing, the assembly being adjustable in such a manner as to preload the bearing system and thus support the shaft with a minimum amount of deflection when a load is cantilevered on the end of the shaft.

The bearing assembly of this invention is used to support the shaft of the aerodynamic steering fins on the warhead stage of the SUBROC missile. To be suitable for this purpose, the bearing was required to be compact because of the stringent space limitations in this missile. The bearing also had to be rigid in order to support, without substantial deflection, the high aerodynamic loads to which the fins are subjected. Moreover, because the SUBROC missile is launched from beneath the surface of the water, it was required that the bearing assembly be sealed against the entrance of water into the interior of the missile.

Accordingly, it is an object of the present invention to provide a bearing system capable of supporting a shaft with a minimum amount of deflection when a high load is cantilevered on the end of the shaft.

Another object of the invention is the provision of a novel anti-friction bearing assembly which may be easily and accurately preloaded so as to provide the desired rigidity.

A further object of the invention is to provide a bearing assembly which requires a minimum of longitudinal shaft length but yet is still highly resistant to deflecting forces.

Yet another object of the invention is to provide an accurately preloadable bearing assembly which may be locked in the adjusted condition and in which the locking means serves also to transmit rotary torques to the shaft.

Still another object of the invention is to provide a rotary seal integral with the design of the anti-friction bearing asembly and highly resistant to external hydrostatic pressures.

The objects of the invention are achieved in the present bearing assembly by the provision of means to support a needle thrust bearing assembly and a tapered roller bearing assembly in close proximity to one another on the shaft. For this purpose, the shaft is provided with a flange which cooperates with a radially extending surface on the housing to support the needle thrust bearing. The tapered roller bearing is threaded on the shaft so that, by rotating the inner race of the tapered roller bearing, the flange of the shaft can be drawn down against the needle bearing assembly to preload the system. The adjusted condition of the bearing is maintained by means of a locking scheme in which an actuating arm is splined to the shaft below the inner race of the tapered roller bearing and is held in place and biased against the inner race by a lock nut. To provide the desired hydraulic sealing, an O-ring is provided which engages the periphery of the flange.

Other objects, advantages and novel features of the invention will become apparent from the following detailed description when considered in conjunction with the single figure of the accompanying drawing which shows an elevational view partly in section of a preferred embodiment of the invention.

Referring now to the drawing, fin shaft 4 is rotatably mounted within the bearing housing 5 and has an integral flange member 9 extending radially therefrom into the recess portion 19 of the bearing housing 5. A needle thrust bearing assembly is mounted within recess portion 19 of the bearing housing and comprise a first race member 8 adjacent to the radially extending surface 25 of recess 19 in housing 5. The thrust bearing further includes a second race member 7 adjacent to the flanges 9 of the shaft and a plurality of needle thrust bearing members 6 rotatably mounted between the first and second race members around the outer periphery of shaft 4. An O-ring seal 13 is mounted in a circumferential cavity 20 in the surface of recess portion 19 of housing 5 which is adjacent the periphery of flange 9. The O-ring is in sealing engagement with the periphery of flange 9 to prevent the entrance of water from outside.

A tapered roller bearing assembly is located adjacent to the needle thrust bearing and likewise positioned between the shaft 4 and bearing housing 5. The roller bearing assembly comprises an inner race member 14, which is threadedly attached to a first threaded portion 12 on shaft 4, and an outer race member 11 fixedly secured within a second recessed portion of the bearing housing 5. A plurality of tapered rollers 21 are rotatably mounted between the inner and outer race members 14 and 11 around the outer periphery of the shaft 4, and the inner race member 14 may be moved along the length of the shaft 4 to vary the distance between the needle thrust bearing assembly and the tapered roller bearings.

In assembling the device, the inner race member 14 is threaded onto the threaded portion 12 of shaft 4 and, as contact is made between the inner race member 14 and the tapered rollers 21, the shaft will be drawn down until flange 9 makes contact with the needle thrust bearing assembly. A torque wrench is then applied to the inner race 14 and a torque of 6 to 10 foot pounds is used to tighten inner race member 14 to thereby preload the system.

In order to transmit rotary motions to the fin shaft 4, an actuator arm 16 is provided which is moved by means of servo apparatus not shown in response to signals from the guidance system of the missile. At one end 16a, the arm 16 is provided with an internally splined bore which cooperates with a splined portion 4a on shaft 4 to impart rotative torques to shaft 4. Arm 16 is secured in place by means of a nut 17 threaded onto a second threaded portion of shaft 4.

It will be apparent that arm 16 acts also as a locking spacer between inner race 14 and nut 17. When nut 17 is tightened, the end 16a of arm 16 is biased upwardly against the inner race 14, thereby locking it in its adjusted position. The splined portion 4a of the shaft cooperates in the locking operation to prevent the transmission to arm 16 of the rotational torques resulting from the rotation of nut 17. Thus the locking function is achieved without the possibility of rotating inner race 14 and thereby losing the accurate preadjustment thereof.

The bearing according to the present invention is highly efficient in that it reduces shaft deflection by 90% of the deflection exhibited in previous systems employed. Wear has been greatly reduced. The combination of a needle bearing and a tapered roller bearing results in an assembly which occupies a small portion of the longitudinal length of the shaft. The adjustable inner race of the tapered roller bearing provides a system in which extremely accurate preloading can be achieved. The cooperation of actuating arm 16 and the splined portion 4a of shaft 4 with locking nut 17 provides not only an efficient locking means for the inner race 14 but also a convenient means for imparting oscillation or rotation to shaft 4. This dual result further adds to the compactness of the present device.

Finally, the design of the assembly with the flanged shaft provides a convenient means of sealing the bearing against the entrance of water from outside. The reduction in deflection due to cantilevered loads also aids in the sealing function, since it is such deflection which tends to separate the shaft and a sealing member. Thus, each of the elements of the invention cooperate to provide the desired bearing which is compact in construction, capable of supporting high loads without deflection, and conveniently sealed against the entrance of water from outside.

Obviously many modifications and variations of the present invention are possible in the light of the above teachings. It is therefore to be understood that within the scope of the appended claim the invention may be practiced otherwise than as herein specifically described.

What is claimed is:

A compact anti-friction bearing assembly comprising
a shaft having an integral radial annular flange thereon, said shaft also having a first threaded portion thereon adjacent said flange, a splined portion adjacent said threaded portion and a second threaded portion adjacent said splined portion,
a housing having an opening therethrough in which said shaft is adapted to be rotatably mounted, said housing having a radially extending surface facing said flange and a surface adjacent to the periphery of said flange,
a needle thrust bearing assembly disposed between said flange and said radially extending surface,
a tapered roller bearing assembly disposed between said housing and said shaft, said tapered roller bearing assembly having an outer race fixedly secured in said housing and an inner race adjustably mounted on said shaft, said inner race having internal threads therein cooperating with the first threaded portion of said shaft, whereby the distance between said tapered roller bearing assembly and said needle thrust bearing assembly may be varied to preload the entire assembly,
means to impart rotative torque to said shaft, said means comprising an actuator arm having a splined opening at one end thereof engaging the splined portion of said shaft,
a nut threadedly engaged with said second threaded portion of said shaft and biasing said actuator arm into engagement with said inner race to lock said inner race in its adjusted position, and
an O-ring seal supported in said housing surface adjacent the periphery of said flange, and sealingly engaged with said flange.

References Cited by the Examiner

UNITED STATES PATENTS

| | | | |
|---|---|---|---|
| 2,728,618 | 12/1955 | Brown et al. | 308—222 |
| 3,031,239 | 4/1962 | Pitner | 308—235 |

DON A. WAITE, *Primary Examiner.*

FRANK SUSKO, *Examiner.*